United States Patent
Bhogal et al.

(10) Patent No.: US 9,483,110 B2
(45) Date of Patent: Nov. 1, 2016

(54) ADAPTIVE MEDIA FILE REWIND

(75) Inventors: Kulvir S. Bhogal, Pflugerville, TX (US); Rick A. Hamilton, II, Charlottsville, NC (US); Andrew R. Jones, Round Rock, TX (US); Brian M. O'Connell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/290,193

(22) Filed: Nov. 7, 2011

(65) Prior Publication Data

US 2013/0117248 A1    May 9, 2013

(51) Int. Cl.
| | | |
|---|---|---|
| G06F 7/00 | (2006.01) | |
| G06F 3/01 | (2006.01) | |
| G11B 27/10 | (2006.01) | |
| G11B 27/36 | (2006.01) | |
| H04N 21/414 | (2011.01) | |
| H04N 21/422 | (2011.01) | |
| H04N 21/4223 | (2011.01) | |
| H04N 21/432 | (2011.01) | |
| H04N 21/439 | (2011.01) | |
| H04N 21/44 | (2011.01) | |
| H04N 21/442 | (2011.01) | |
| H04N 21/472 | (2011.01) | |
| G06F 3/16 | (2006.01) | |

(Continued)

(52) U.S. Cl.
CPC .............. *G06F 3/013* (2013.01); *G06F 3/165* (2013.01); *G11B 27/102* (2013.01); *G11B 27/105* (2013.01); *G11B 27/36* (2013.01); *H04N 21/41407* (2013.01); *H04N 21/4223* (2013.01); *H04N 21/42203* (2013.01); *H04N 21/4325* (2013.01); *H04N 21/4394* (2013.01); *H04N 21/44008* (2013.01); *H04N 21/44218* (2013.01); *H04N 21/47217* (2013.01); *G06F 3/0481* (2013.01); *G06F 17/30017* (2013.01)

(58) Field of Classification Search
CPC ....................... G06F 17/30017; G06F 3/0481
USPC ........................... 707/999.102, 999.101, 705
See application file for complete search history.

(56) References Cited

U.S. PATENT DOCUMENTS

| | | | | | |
|---|---|---|---|---|---|
| 4,937,601 A | * | 6/1990 | Azuma | ................. | G03B 7/091 396/410 |
| 5,159,365 A | * | 10/1992 | Takahashi | ................ | G03B 7/24 396/285 |
| 5,341,187 A | * | 8/1994 | Kurei | ................... | G03B 17/425 396/410 |

(Continued)

OTHER PUBLICATIONS

Bruce I. Ebersman, AUS920110386US1, Office Action, Nov. 5, 2012.

(Continued)

*Primary Examiner* — Usmaan Saeed
(74) *Attorney, Agent, or Firm* — Damion Josephs; Robert C. Rolnik

(57) ABSTRACT

An addressable device receives a user-characterized rewind description. The addressable device stores the user-characterized rewind description. The addressable device renders an at least one media file to include a resume point of the at least one media file. The addressable device receives a command to preferentially rewind. The addressable device, responsive to receiving the command to preferentially rewind, re-renders the at least one media file to the user-characterized rewind description such that the display shows the at least one media file at a replay point of the media file at least the user-characterized rewind description prior to the resume point.

9 Claims, 5 Drawing Sheets

(51) Int. Cl.
*G06F 17/30* (2006.01)
*G06F 3/0481* (2013.01)

(56) References Cited

U.S. PATENT DOCUMENTS

| | | | | |
|---|---|---|---|---|
| 5,475,811 A * | 12/1995 | Neumann | G06F 9/4443 | |
| | | | 345/473 | |
| 5,754,773 A * | 5/1998 | Ozden | H04N 21/2387 | |
| | | | 348/E5.008 | |
| 5,946,518 A * | 8/1999 | Huang | G03B 17/02 | |
| | | | 396/536 | |
| 6,005,563 A * | 12/1999 | White | G06F 3/0236 | |
| | | | 348/E5.002 | |
| 6,064,380 A * | 5/2000 | Swenson | G06F 17/30017 | |
| | | | 707/E17.009 | |
| 6,236,801 B1 * | 5/2001 | Engle | G11B 15/026 | |
| | | | 386/230 | |
| 6,366,296 B1 | 4/2002 | Boreczky et al. | | |
| 6,496,205 B1 * | 12/2002 | White et al. | 715/824 | |
| 7,027,621 B1 | 4/2006 | Prokoski | | |
| 7,127,736 B2 * | 10/2006 | Kondo | G06F 17/30017 | |
| | | | 348/E7.071 | |
| 7,333,712 B2 * | 2/2008 | Jeannin | G06F 17/30843 | |
| | | | 386/248 | |
| 7,460,130 B2 * | 12/2008 | Salganicoff | 345/590 | |
| 2003/0037068 A1 * | 2/2003 | Thomas | H04N 5/76 | |
| 2003/0152363 A1 * | 8/2003 | Jeannin | G06F 17/30843 | |
| | | | 386/290 | |
| 2006/0075347 A1 | 4/2006 | Rehm | | |
| 2006/0153399 A1 * | 7/2006 | Davis, Jr. | H04R 5/027 | |
| | | | 381/92 | |
| 2008/0162590 A1 * | 7/2008 | Kundu | G06F 11/1471 | |
| 2008/0200154 A1 | 8/2008 | Maharajih et al. | | |
| 2008/0256255 A1 | 10/2008 | Mordovskoi et al. | | |
| 2008/0313682 A1 | 12/2008 | Kajiura | | |
| 2009/0138507 A1 | 5/2009 | Burckart et al. | | |
| 2009/0202221 A1 | 8/2009 | Guo et al. | | |
| 2009/0217336 A1 | 8/2009 | Chang et al. | | |
| 2009/0259326 A1 * | 10/2009 | Pipitone et al. | 700/94 | |
| 2009/0285545 A1 | 11/2009 | Bon | | |
| 2009/0290852 A1 * | 11/2009 | Wright | H04H 60/31 | |
| | | | 386/241 | |
| 2009/0324098 A1 * | 12/2009 | Nilsson | H04N 1/00307 | |
| | | | 382/209 | |
| 2010/0122277 A1 * | 5/2010 | Fonseca | G11B 27/105 | |
| | | | 725/10 | |
| 2011/0075985 A1 | 3/2011 | Potrebic et al. | | |
| 2011/0205383 A1 * | 8/2011 | Shah | H04N 5/232 | |
| | | | 348/222.1 | |
| 2011/0234480 A1 | 9/2011 | Fino et al. | | |
| 2011/0283305 A1 | 11/2011 | Davis et al. | | |
| 2011/0317760 A1 * | 12/2011 | Chen | G11B 27/007 | |
| | | | 375/240.12 | |
| 2012/0002953 A1 * | 1/2012 | McKiel, Jr. | H04N 5/783 | |
| | | | 386/345 | |
| 2012/0078939 A1 * | 3/2012 | Chen | G06F 17/30516 | |
| | | | 707/769 | |
| 2012/0087511 A1 * | 4/2012 | Lumsden | H04R 1/1016 | |
| | | | 381/74 | |
| 2012/0197846 A1 * | 8/2012 | Peng | G06F 11/1662 | |
| | | | 707/679 | |
| 2013/0080413 A1 * | 3/2013 | Chen | G06F 17/30584 | |
| | | | 707/706 | |

OTHER PUBLICATIONS

Robert C. Rolnik, AUS920110386US1, Response to Office Action, Feb. 4, 2013.
Bruce I. Ebersman, AUS920110386US1, Final Office Action, Feb. 28, 2013.
Robert C. Rolnik, AUS920110386US1, Amendment to Office Action, Apr. 2, 2013.
Robert C. Rolnik, AUS920110386US1, Request for Continued Examination, May 24, 2013.
Bruce I. Ebersman, AUS920110386US1, Office Action_2, Jan. 15, 2015.
Robert C. Rolnik, AUS920110386US1, Response to Office Action, Feb. 6, 2015.
Bruce I. Ebersman, AUS920110386US1, Final Office Action, Apr. 10, 2015.
Robert C. Rolnik, AUS920110386US1, Amendment to Office Action, Apr. 28, 2015.
Robert C. Rolnik, AUS920110386US1, Request for Continued Examination_2, Aug. 18, 2015.

* cited by examiner

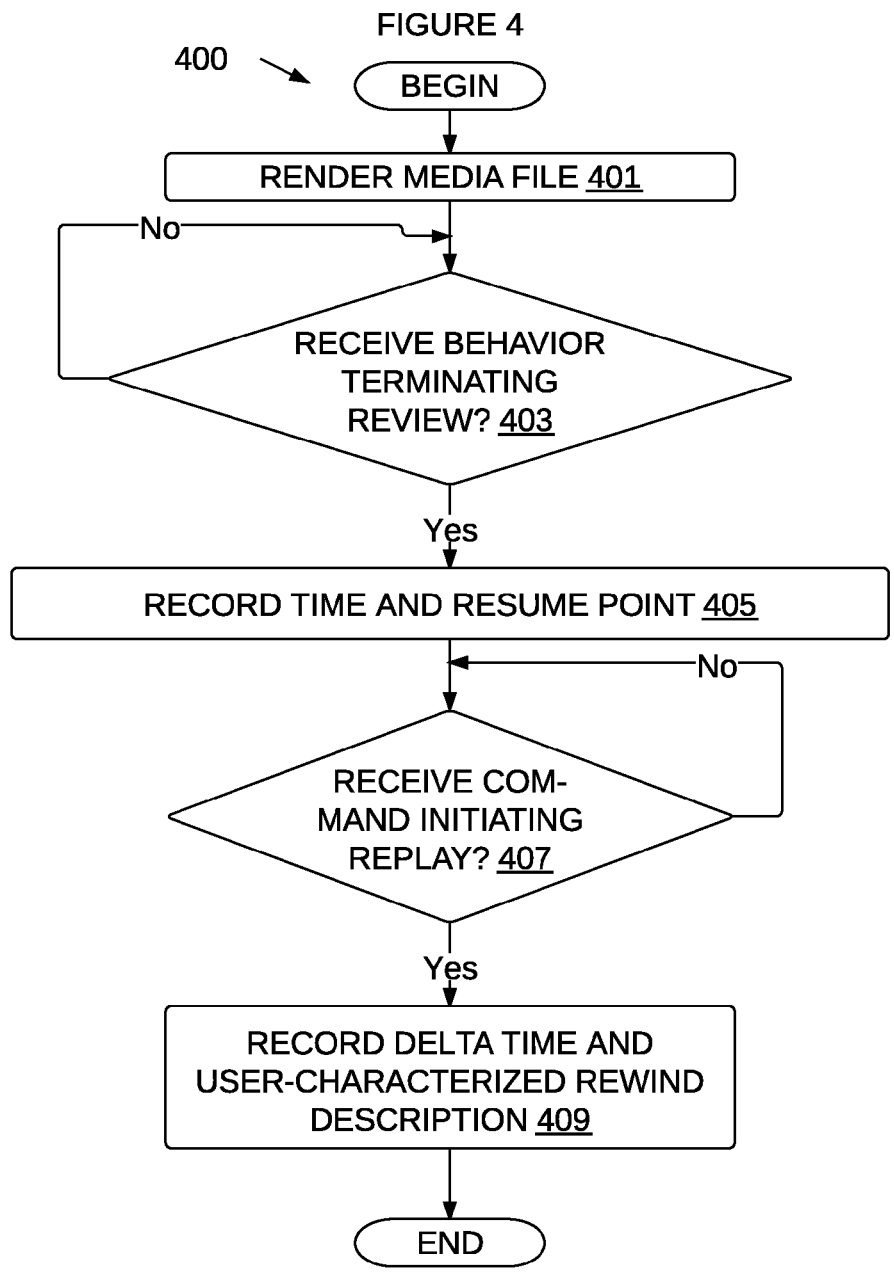

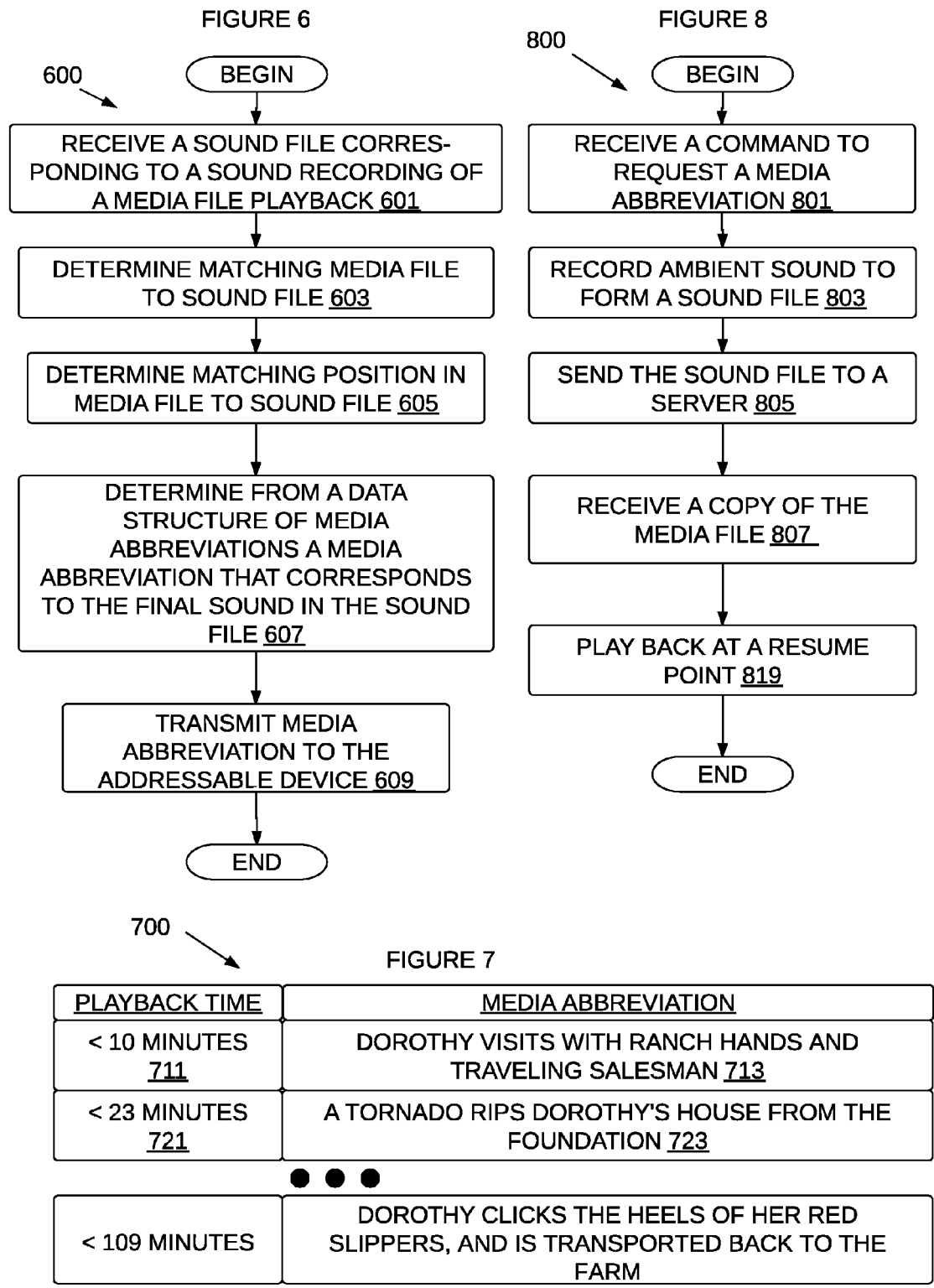

ADAPTIVE MEDIA FILE REWIND

BACKGROUND

The present invention relates to a computer implemented method, data processing system, and computer program product for rendering media files and more specifically to a manner of responding to user inputs to anticipate and act on preferences to review portions of media files.

Electronic reading devices and related machines provide users convenient platforms to read or otherwise enjoy media files. Media files are files that an electronic reading device or other data processing system can play back or otherwise render so that the user can view and/or hear the media file.

Different people comprehend and recall at differing levels. In addition, differing book subjects or genres can challenge even the same reader to recall the content of a book that has recently been set aside, for example, because of a holiday or sleeping. In the situation where a reader sets aside his ebook/ereader for an extended hiatus, the reader may re-read a portion of the book that leads up to the point at which he had previously finished reading. This review helps the reader reinforce and recall the plot thread so that he can better comprehend the continuing text.

Electronic book readers, such as the Kindle™ ereader and the NOOK™ ereader, offer the capability to navigate from page to page of a rendered book. Other applications, for example, that operate on general purpose computers, for example, Amazon's Audible™ audio-book player offer the feature of rewinding in a manner reminiscent of the old tape recorders. In all cases, these machines fail to provide some form of rapid and/or adaptive way to adjust to render material for purposes of review that suits the tastes of particular users. Kindle, Audible and Amazon are trademarks of Amazon.com, Inc. NOOK is a trademark of Barnes & Noble, Inc.

Accordingly, a remedy is desirable.

SUMMARY

According to one embodiment of the present invention an addressable device receives a user-characterized rewind description. The addressable device stores the user-characterized rewind description. The addressable device renders the at least one media file to include a resume point of the at least one media file. The addressable device receives a command to preferentially rewind. The addressable device, responsive to receiving the command to preferentially rewind, re-renders the at least one media file to the user-characterized rewind description such that the display shows the at least one media file at a replay point of the media file at least the user-characterized rewind description prior to the resume point.

BRIEF DESCRIPTION OF THE SEVERAL VIEWS OF THE DRAWINGS

FIG. 4 is a flow chart of a process on a mobile device in accordance with an embodiment of the invention;

FIG. 5A is a data structure of user-characterized rewind descriptions in accordance with an embodiment of the invention;

FIG. 6 is a flow chart of a process on a server in accordance with an embodiment of the invention;

FIG. 7 is a data structure of media abbreviations corresponding to a media file in accordance with an embodiment of the invention; and FIG. 8 is a flow chart of a process on a mobile device in accordance with an illustrative embodiment of the invention.

DETAILED DESCRIPTION

Figure 1:
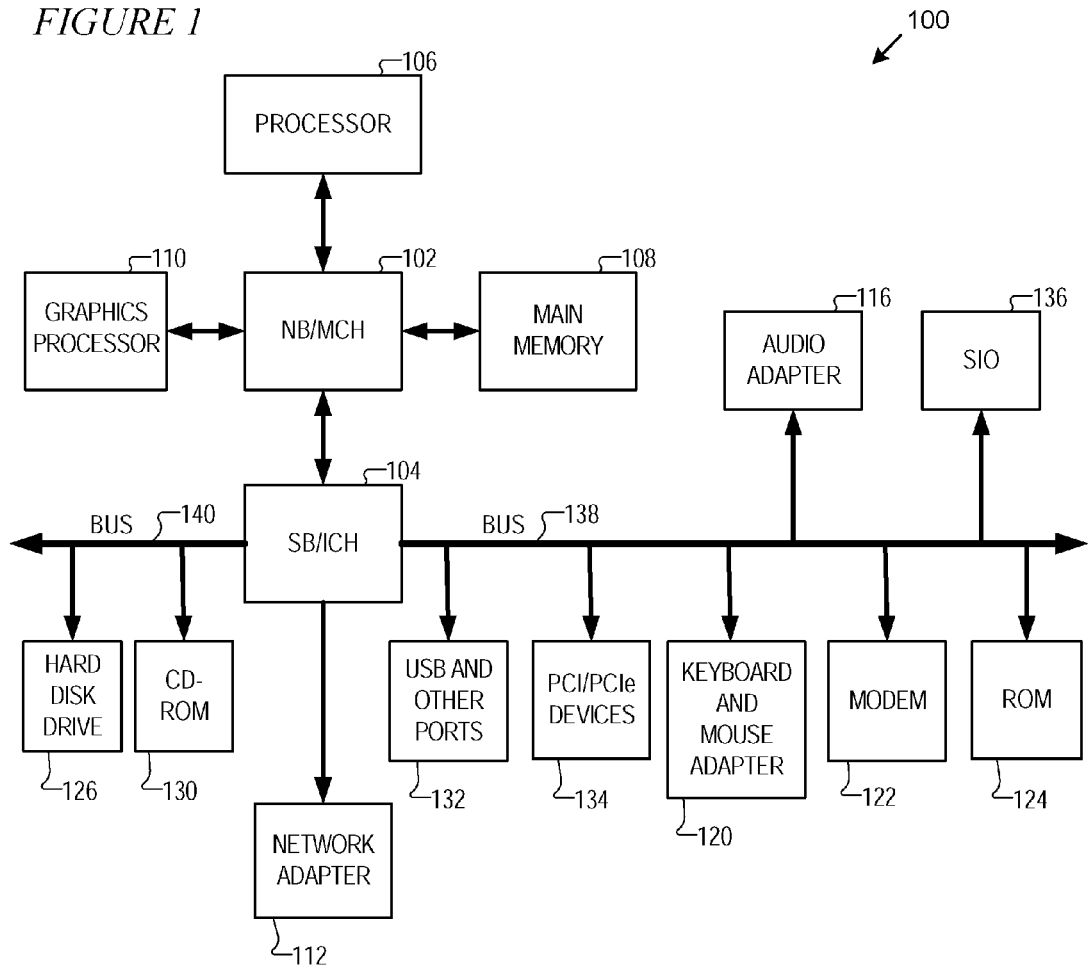
FIG. 1 is a block diagram of a data processing system in accordance with an illustrative embodiment of the invention.

With reference now to the figures and in particular with reference to FIG. 1, a block diagram of a data processing system is shown in which aspects of an illustrative embodiment may be implemented. Data processing system 100 is an example of a computer, in which code or instructions implementing the processes of the present invention may be located. In the depicted example, data processing system 100 employs a hub architecture including a north bridge and memory controller hub (NB/MCH) 102 and a south bridge and input/output (I/O) controller hub (SB/ICH) 104. Processor 106, main memory 108, and graphics processor 110 connect to north bridge and memory controller hub 102. Graphics processor 110 may connect to the NB/MCH through an accelerated graphics port (AGP), for example.

In the depicted example, local area network (LAN) adapter 112 connects to south bridge and I/O controller hub 104 and audio adapter 116, keyboard and mouse adapter 120, modem 122, read only memory (ROM) 124, hard disk drive (HDD) 126, CD-ROM drive 130, universal serial bus (USB) ports and other communications ports 132, and PCI/PCIe devices 134 connect to south bridge and I/O controller hub 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash binary input/output system (BIOS). Hard disk drive 126 and CD-ROM drive 130 may use, for example, an integrated drive electronics (IDE) or serial advanced technology attachment (SATA) interface. A super I/O (SIO) device 136 may be connected to south bridge and I/O controller hub 104.

An operating system runs on processor 106, and coordinates and provides control of various components within data processing system 100 in FIG. 1. The operating system may be a commercially available operating system such as Microsoft® Windows® XP. Microsoft and Windows are trademarks of Microsoft Corporation in the United States, other countries, or both. An object oriented programming system, such as the Java™ programming system, may run in conjunction with the operating system and provides calls to the operating system from Java™ programs or applications executing on data processing system 100. Java™ is a trademark of Sun Microsystems, Inc. in the United States, other countries, or both.

Instructions for the operating system, the object-oriented programming system, and applications or programs are located on computer readable tangible storage devices, such as hard disk drive 126, and may be loaded into main memory 108 for execution by processor 106. The processes of the embodiments can be performed by processor 106 using computer implemented instructions, which may be located in a memory such as, for example, main memory 108, read only memory 124, or in one or more peripheral devices.

Those of ordinary skill in the art will appreciate that the hardware in FIG. 1 may vary depending on the implementation. Other internal hardware or peripheral devices, such as flash memory, equivalent non-volatile memory, and the like, may be used in addition to or in place of the hardware depicted in FIG. 1. In addition, the processes of the illustrative embodiments may be applied to a multiprocessor data processing system.

In some illustrative examples, data processing system 100 may be a personal digital assistant (PDA), which is configured with flash memory to provide non-volatile memory for storing operating system files and/or user-generated data. A bus system may be comprised of one or more buses, such as a system bus, an I/O bus, and a PCI bus. Of course, the bus system may be implemented using any type of communications fabric or architecture that provides for a transfer of data between different components or devices attached to the fabric or architecture. A communication unit may include one or more devices used to transmit and receive data, such as a modem or a network adapter. A memory may be, for example, main memory 108 or a cache such as found in north bridge and memory controller hub 102. A processing unit may include one or more processors or CPUs. The depicted example in FIG. 1 is not meant to imply architectural limitations. For example, data processing system 100 also may be a tablet computer, laptop computer, or telephone device in addition to taking the form of a PDA.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, one or more embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Any combination of one or more computer readable storage device(s) may be utilized. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage device may be any tangible device that can store a program for use by or in connection with an instruction execution system, apparatus, or device. The term "computer-readable storage device" does not encompass a signal propagation media such as a copper cable, optical fiber or wireless transmission media.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
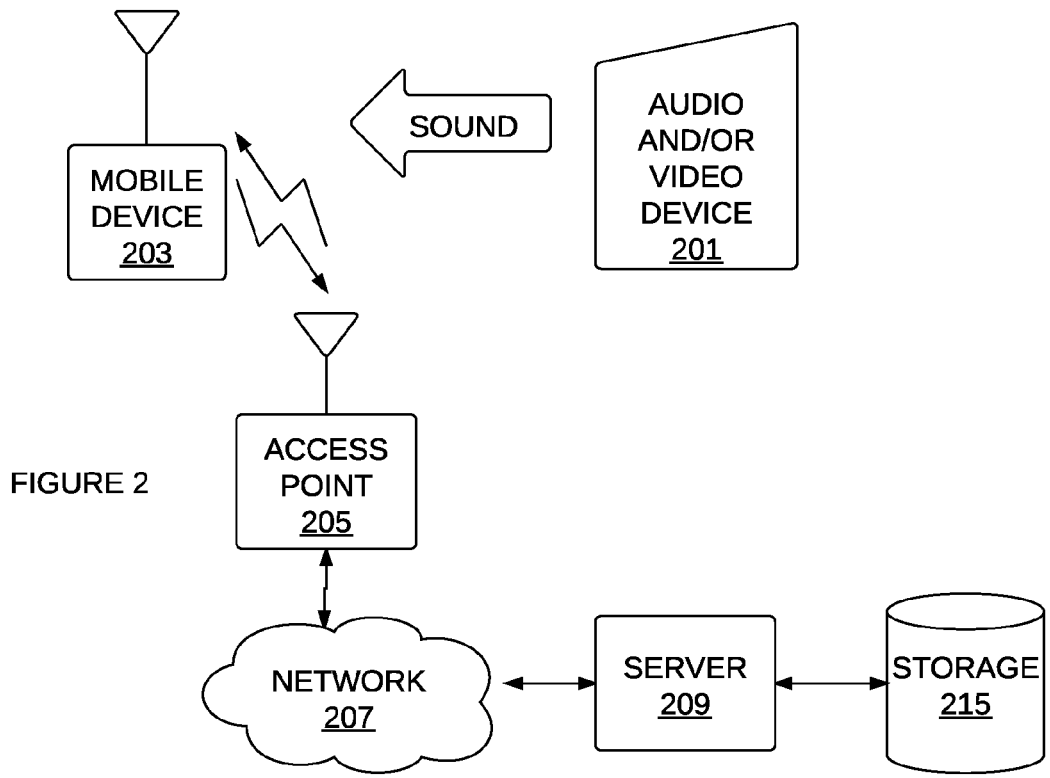
FIG. 2 is a block diagram of a mobile device interacting with a server and an audio and/or video device in accordance with an embodiment of the invention.

FIG. 2 is a block diagram of a mobile device interacting with a server and an audio and/or video device in accordance with an embodiment of the invention. A user may carry mobile device 203 into a room or elsewhere where the sound of audio and/or video device 201 can be sampled or otherwise measured. An audio and/or video device can be a video cassette recorder (VCR), digital versatile disk (DVD) player, computer hosting streaming content and the like. An addressable device is a data processing system, for example, data processing system 100 of FIG. 1, that has at least a media access control (MAC) address and/or an Internet protocol address through which the addressable device receives or transmits information. Mobile device 203 is an addressable device.

Mobile device 203 may access network 207 via access point 205. Network 207 can be, for example, the Internet. As such, mobile device 203 can transmit data to, and receive data from, server 209. Mobile device 203 can take many forms, including a tablet computer, smart phone, or any other data processing system. Some embodiments make use of a microphone that can be part of mobile device 203. Further embodiments may rely on the use of a camera on mobile device 203, particularly, to read details concerning a user's gaze.

Server 209 can access storage 215 either local to the server, or located elsewhere. Storage 215 can store reference sound files indexed to passages of the media abbreviation for any illustrative embodiments that require the server to lookup a media file and match an ad hoc recorded sound to a specific media file. As such, storage 215 can be used to help resolve which media file a user is enjoying.

The illustrative embodiments permit a mobile device to adjust the amount of replay of previously rendered or played material to a user that is interrupted by various disturbances or for varying times. In other words, the replay can be short, for limited absences or disturbances, and the replay can be longer for situations where the user is absent for longer durations, or where more intense disturbances occur prior to pausing normal playback. Some illustrative embodiments can account for the onset of sleep, impact of persistent interfering noise and other factors that contribute to attention deficits. Accordingly, some embodiments can expose a user to increasing levels of replayed material to compensate for a reduced attention, prolonged delay and/or complexity of material at the time of interrupting and/or resumption of material in the rendered media file. These embodiments are chiefly, though not exclusively, illustrated in FIGS. 1-5.

Further illustrative embodiments of the invention can permit a user to receive a media abbreviation when continuous viewing of a media file is impossible or impractical. As such, some illustrative embodiments permit a user to receive a status update when skipping over tracts of a media file such as a digitized movie. Still further illustrative embodiments can allow a user to obtain a portion of a file that is not yet rendered to the user's eyes or ears and avoid rehashing previously viewed material, either entirely or substantially. Yet more illustrative embodiments can allow a file transfer to be diminished in size in response to a user's previous history of viewing and/or listening to the rendered file or file copy. An additional feature can include reducing the quaility of the media file, such as, for example, reducing definition from 1280I to 720P for high definition (HD) video. These embodiments are chiefly, though not exclusively, illustrated in FIGS. 1-2 and 6-8.

Figure 3:
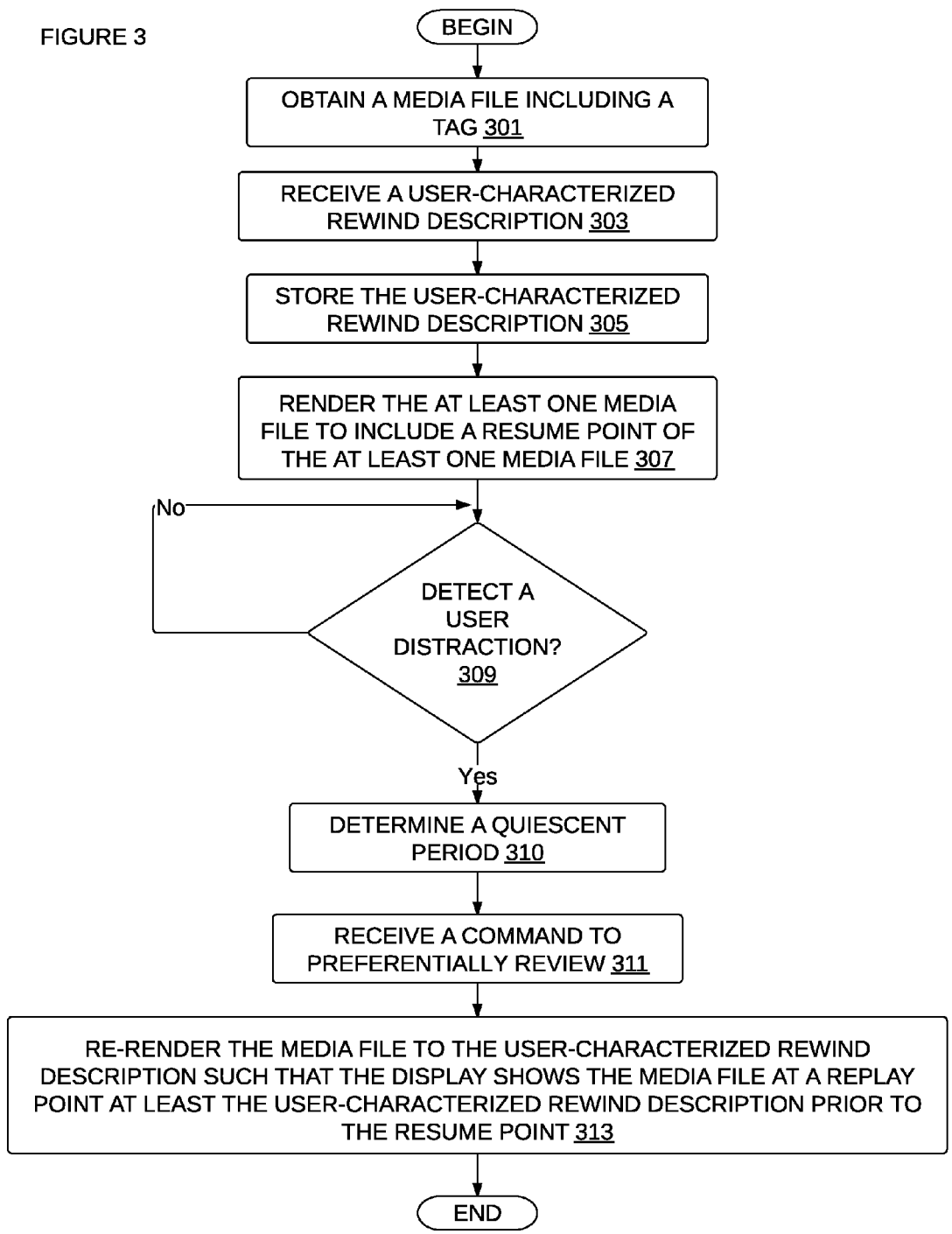
FIG. 3 is a flow chart of a process on a mobile device in accordance with an embodiment of the invention.

FIG. 3 is a flow chart of a process on a mobile device in accordance with an embodiment of the invention. Initially, an addressable device obtains a media file, which can include a tag (step 301). The addressable device can be mobile device 203 of FIG. 2. A media file is any photo, video, sound or text file that is stored to a digital format and organized for serial rendering. Examples of media files include MP3 files, electronic books files, MPEG files and the like.

Next, the addressable device receives a user-characterized rewind description (step 303). A user-characterized rewind description is information that a user provides, either explicitly or through historical usage, that indicates a degree to which a user prefers to replay or re-render media previously rendered in a session initiated by the user. For example, if a user indicates that her preference is that absences of 100 minutes cause a replay of 1 minute of material previously rendered to her, then heuristics can be used to set user-characterized rewind descriptions to be the formula: replay 1% of the previously rendered material as a fraction of time the user has paused or otherwise been absent from the playback of the media file. Similarly, the user can set multiple points of delay, for example, that 1 minute of absence be treated the same as 25 minutes of absence, that is, to play back in a redundant manner 90 seconds of material. Accordingly, for this kind of heuristic, an addressable device can play back 90 seconds of material, if the user is away for 5 minutes.

Figure 5B:
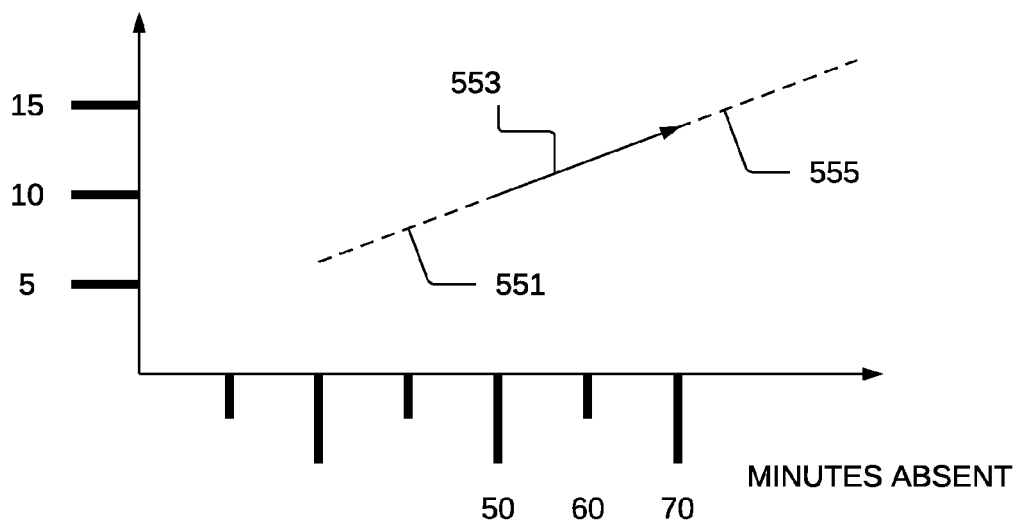
FIG. 5B is a graph of a user-characterized rewind description in accordance with an embodiment of the invention.

As may be appreciated, many other forms of heuristics can be used, for example, using many data points of preferences provided by a user and applying a best-fit curve to the data, and using such a formula for the curve to establish the user-characterized rewind description. In addition, data for rewind preferences can be segregated into groups depending on the type of material being rendered, for example, its complexity, as explained further below. Further, for media that are not streamed, for example, electronic books, the units of material can be expressed in units other than minutes. For example, a graph or formula as depicted in FIG. 5B can be modified to describe sentences, paragraphs, chapters or any other suitable description in lieu of minutes of replay or rewind preference.

Next, the addressable device may store the user-characterized rewind description (step 305). The storing may consist of recording information on hard disk drive 126 of FIG. 1, using, for example, a data structure described below, in FIG. 5A. The user-characterized rewind description can establish that short intervals of stopping and/or pausing media file playback are to be followed by a brief interval of re-rendering the media file, followed by rendering portions not previously rendered to the user.

Next, the addressable device may render the at least one media file to include a resume point of the media file (step 307). A resume point is the text, image and/or sound that immediately follows the material rendered at a time of pausing or stopping. In contrast, a replay point is text, image and/or sound data previously rendered, which precedes the resume point.

Next, the addressable device may detect a user distraction (step 309). Detecting a user distraction can include detecting user inattentiveness based on a threshold ratio of eyes-closed to eyes-open, for example, by using a camera and filtering the streamed video through an eye detecting algorithm. User inattentiveness is a measure of a user being unable to process the information content in the rendered media file. User inattentiveness can come in many forms. The user may be inattentive because of loud noises that interfere with media file comprehension. The user may be inattentive because of a received phone call. User inattentiveness further can occur because a user steps away from the addressable device.

Accordingly, many forms of user distraction or user inattentiveness can be detected, through the operation of microphone, camera and other features of the addressable device. Thus, a user that is 'away' can be actually unconscious, distracted by conversation, or in any of a number of situations where the user's full attention is not applied to the material being rendered.

A threshold ratio of eyes-closed to eyes-open can be a predetermined duration of time that the user's eyes are closed as compared to a predetermined sampling period. The predetermined sampling period can be as short as one minute. The threshold ratio of eyes-closed to eyes-open can be 0.50, for example. As can be appreciated, the time period can be user-selectable according to the preferences of the user, for example, by the user inputting preferences to a suitable user interface of a mobile device. Further, the addressable device, responsive to detecting a user inattentiveness, can update the replay point to a location that is overlapped to previously rendered material in proportion to a delay between user inattentiveness and receiving the command to preferentially review. Previously rendered material is material that is rendered to a particular user, within a user-selectable period, in relation to any currently requested preferential review. The user-selectable period can be, for example, one year. It is appreciated that a default setting can be a user-selectable period.

In addition to detecting a user distraction at step 309, further illustrative embodiments may be able to detect a distraction level. A distraction level is a value assigned to a time that a user is determined to not be fully focused. As such, the distraction level can be high as 100%, when a user looks away from a visibly rendered material, for example as may occur during a telephone call. The distraction level can be moderate, for example, when listening to loud music. These types of information can be obtained from a microphone and any camera attached to the addressable device. Once a specific threshold level of sound is achieved, an addressable device may detect user inattentiveness to be occurring, provided, for example, that a sufficient interval of measuring such sound levels occurs. A threshold level of sound is that strength of sound, which is predetermined to suggest user distraction. The threshold level of sound can be measured in decibels. The interval can be a period that is predetermined to not generate false indications of distraction, for example, longer than the period of a pair of hands making a single clap.

Next, the addressable device may determine a quiescent period (step 310). A quiescent period is a time between detecting a user to be distracted, for example, a positive determination per step 309, and a determination of user absence. A determination of user absence can occur based on a user manually inputting to the addressable device to stop or pause rendering. In which case, the user is absent in the sense that her attention is unable to fully appreciate the rendered media file. A determination of user absence can occur based on the user becoming unconscious or that their gaze points to something other than the addressable device. This determination can occur based on the addressable device obtaining image data through a camera, for example, sampling the environment on the display side of the addressable device to detect the user's face and the visibility of the user's eyeballs. It is appreciated that there are many alternative methods of determining a user absence, both in the sense that the user is not in the vicinity of the addressable device and in the sense that the user is not paying attention. A negative determination, can cause the addressable device to repeatedly check for user distraction via step 309.

Next, the addressable device may receive a command to preferentially review (step 311). A command to preferentially review can be a user interface command received through a keyboard, microphone or camera of the addressable device. For example, a command to preferentially review can be a voice initiated command, "continue playback", for example, with respect to a video. Alternate forms of a command to preferentially review can include using a touch interface to select an area labeled or otherwise visible in the touch interface that suggests playing back. A touch input is input made to a touch sensitive user interface, such as, for example, a mutual capacitance screen, keyboard, or other tactile device.

Accordingly, the steps thus far can prepare the addressable device to apply inputs obtained from the user's previous interactions to establish a user-characterized rewind description that, if not providing the exact replay period for a specific absence period, at least provides sufficient details for interpolating or extrapolating a user's likely preference for other specific absence periods, such as a determined quiescent period. Thus, re-rendering can involve the application of these mathematical concepts, as well as others, to extend the user's previously indicated preferences to position playback to a point before the resume point.

Next, the addressable device can re-render the media file to the user-characterized rewind description such that the display shows the media file at a replay point at least the user-characterized rewind description prior to the resume point (step 313). In this manner, the addressable device can play a segment of the media file that can overlap the segment previously rendered to the user, for example, compensating for the length of time, or delta time, between stopping an initial rendering, and receiving the command to preferentially review. Processing may terminate thereafter.

It is appreciated that the addressable device can adjust the replay point farther back in time than what a mere absence time suggests. Accordingly, in such embodiments, the addressable device may rewind to a replay point based on the sounds, wherein the re-rendering is based on the distraction level. As such, the replay time may be moved back based on some multiple of distraction level, such that a higher distraction level results in a greater redundant play back, while a lower distraction level may result in a reduced play back.

FIG. 4 is a flow chart of a process on a mobile device in accordance with an illustrative embodiment of the invention. Historical rewind description process 400 is a process by which a mobile device can obtain and further refine the user-characterized rewind description based on the user's continued use. Accordingly, the mobile device may initially render a media file (step 401). Next, the mobile device may determine whether it has received a behavior terminating review (step 403). A behavior terminating review is a user originated prevention, halting or pausing of the rendering of a media file. A behavior terminating review can be a command terminating review. In other words, a user's behavior can be so subtle, as to be arguably not a 'command', and yet, the behavior is still a command. A command terminating review can be the product of a user's conscious thought, such as touching a button. Otherwise, a command terminating review can be an unconscious and even unintentional behavior of the user, such as falling asleep.

A negative determination at step 403 can result in repeatedly performing step 403. In response to a positive determination at step 403, the mobile device can record time and a resume point (step 405). Next, the mobile device may determine whether it received a command initiating replay (step 407). If a command initiating replay is not received, step 407 may be repeated until the command initiating replay is received. A command initiating replay is a command, received by the mobile device, that signals a restart of rendering, such as by the pressing, clicking or usage of a touch interface that corresponds to a playback of the media file. In addition, the command initiating replay can include voice commands that state, for example, 'restart', 'continue', and the like. Further, such commands may additionally include a user repositioning a replay point to some minutes, chapters, or other description prior to the review point at which the playback was stopped. In other words, a user can tailor the playback to suit his or her recollection of the specific information that he last remembers from the previously rendered media file, perhaps using a few moments of trial and error to rollback or fast-forward along a continuum of playback time, to the preferred point in the previously rendered media file that the user wants to see and/or hear with respect to the rendered media file.

This resetting of playback to a replay point results in a delta time being determined. A delta time is the time difference between the absolute time into a media file between the review point and the replay point. The delta time can range from between a couple seconds to many hours, depending on the length of time the user may have allowed the playback to remain stopped. In some cases, the delta time is the amount of time that a user is away from the mobile device. As such, the delta time can play a role in the user's ability to seamlessly understand and use content from before halting playback to the content that follows the review time.

Thus, the mobile device may determine whether it received a command initiating replay (step 407). Further, if the mobile device did receive a command initiating replay, the mobile device may record the delta time and the user-characterized rewind description (step 409). The user-characterized rewind description is the amount of time the user expects or indicates that the mobile device is to rewind the media file from the replay point. The user-characterized rewind description can be modified by the delta time, as related to other factors, such as, a complexity level of the material presented in the media file. Processing may terminate thereafter.

It is appreciated that historical rewind description process 400 is just one way to collect user-characterized rewind descriptions. Alternatively, a mobile device can collect this information by directing a user to a question and answer or other form to identify how many minutes a user may want to rewind or otherwise re-render material in response to a user's absence, slumber, or other distracting influences, as well as the complexity of the material.

FIG. 5A is a data structure of user-characterized rewind descriptions in accordance with an illustrative embodiment of the invention. Data structure 500 can include three columns. The data structure may be a table, where the first field identifies a maximum amount of time that the media file playback is interrupted. For example, first field 511 identifies an interruption of up to 10 minutes. The interruption can be due to the user being away from the device. The interruption can be due to the user being inattentive to the device. In any event, the interruption, in whatever form, causes the device to detect a behavior terminating review, as in step 403, above. The device can be, for example, mobile device 203 of FIG. 2, which may render, for example, an electronic book. Alternatively, the device can be a more robust audio and/or video device, such as 201 of FIG. 2.

Either by the historical rewind description process, FIG. 4, or, for example, by explicit user form entry, the mobile device can populate further fields of data structure 500. Second field 513 identifies the user's currently indicated preferred duration of rewind. The second field can be expressed in time. The second field can be expressed in an amount of words, or other written features, such as paragraphs. Further, the second field can be expressed in percentages of the media file size.

Some illustrative embodiments can even account for complexity, genre, language, subject or a host of other factors that can, for a particular user, impact the amount of time and/or content the user would like re-rendered following a break from playback. Data structure 500 shows an example of storing a complexity factor, 515, in the form of a grade level. The values of genre, language, subject and grade-level can be compared by the mobile device to tags associated with the media file, and thus be used to influence the degree of re-rendering, when the user resumes playing back. A tag is metadata of a media file that provides some context, origin, or other qualification concerning the media file. The tag can be genre, grade-level, subject, language and the like. Re-rendering is the process of a mobile station rendering material of a media file that has previously been rendered for the user regardless of whether the user was present and attentive for the entire period that the material was previously rendered.

Tags can be assigned to a media file by an author, associates of a copyright holder of the media file, a teacher or licensee to a media file, and the like.

FIG. 5B is a graph of a user-characterized rewind description in accordance with an embodiment of the invention. For example, the user-input preferences for media files tagged with complexity factors of 'GRADE 10', can be expressed in connected line segment 553 which relates the time a user is absent or otherwise away to the time the user wants to see replayed from the media files tagged 'GRADE 10'. The addressable device can extrapolate and respond to other 'away times' based on lines 551 and 555 and accordingly make replay decisions based on the user's earlier indicated preferences.

A server, such as server 209 of FIG. 2 can rely on storage to include a library of media files or at least the sound data that corresponds to sounds encoded in the media files. As such, the sounds, possibly in a compressed format, can provide a corpus of search material that can be used to first, categorize from which media file a sound bite or other sound recording comes from; and second, identify sequentially where in the media file the sound recording occurs. A library of media file sound recordings is the corpus of data used to identify which is the matching media file and/or locate positioning in the media file that matches the sound recording. The library can be optimized for search, such that a server can rapidly obtain additional supplemental material corresponding to the file, or perform other look-up services, as described further below.

FIG. 6 is a flow chart of a process on a server in accordance with an illustrative embodiment of the invention. The server can be server 209 of FIG. 2. Initially, the server may receive a sound file corresponding to a sound recording of a media file playback (step 601). A sound recording is the recording of sound present where a media file is audible, after being sent through a speaker. A sound file is the digitized version of the sound recording, for example, as stored to storage or memory. The time of receiving the sound file corresponding to the sound recording of the media file playback from an addressable device is the time that the server or other device receives the sound file corresponding to the sound recording of the media file playback from an addressable device. Next, the server may determine a matching media file to the sound file (step 603). In addition, the server may determine a matching position in the media file to the sound file (step 605). Finding a matching position can be locating the position of the final sound present in the sound file. In other words, if the sound file ends with an applause, then the matching position in the media file will be the data that, when rendered, makes the sound of applause.

There are two ways that the sound file can be processed to form a match to a media file, for example, as stored to a database. The first way involves obtaining the sound file simply from sampling a microphone within audible distance of the device that renders the media file. The sound can be digitized to produce instantaneous audio frequency power distributions across a spectrum of frequencies. Multiple samples can provide a time-varying plot of frequency power distributions during the period of sampling the sound. The resultant data of sound frequencies over time, will contain information that at least includes the raw audio output, as distorted by any speaker or amplifying device of the rendering device. In addition, the resultant data will include extraneous sounds from competing noise sources, unless the media file is being rendered to a very sound-isolated environment. The extraneous sounds can include noises from pets, babies' cries, sounds from friend's gadgets and phones, vehicle noises, weather noises, etc. Accordingly, the sounds sampled to the sound file include some interfering noises and distortion. Nevertheless, these sounds can be compared in one or more stages of comparison of the sound file to the several media files. For example, an instantaneous frequency power distribution at the beginning of the sound file can be compared to the database of media files with a very loose criteria for matching, which will permit matching even with distorting sounds present in the sound file, but will generate many candidate matches from the several media files. Subsequent matching can use many other samples, or even all samples of frequency power distributions in the sound file. However, in this subsequent matching, the domain of media files is reduced, while the standard for matching can be a best match of the sound file to the candidate media files.

A second way that the sound file can be processed to form a match to a media file includes the steps of the first way, but the baseband sound data, prior to conversion to analog and rendering to a speaker, can operate as the sound file to which a matching media file is compared. This second way eliminates any ambient sounds that would be obtained through the first way by eliminating the step of sampling sound using a microphone. In contrast with the first way, described above, the second way dispenses with obtaining a sound recording of a media file playback at step 601. Instead, in place of step 601, the second way involves the server merely obtaining a sound portion of any rendered file, for example, in a digital format in which the file stores the sound. Accordingly, the second way replaces receiving a sound file corresponding to the sound recording of the media file playback, and instead, merely involves the server receiving sound formatted in a digital format.

Next, the server may determine, from a data structure of media abbreviations, a media abbreviation that corresponds to the final sound in the sound file (step 607). In response to finding the media abbreviation, the server may transmit the media abbreviation to the addressable device (step 609). The server may transmit multiple media abbreviations depending on how far the rendering of the media file has progressed. Processing may terminate thereafter.

FIG. 7 is a data structure of media abbreviations corresponding to a media file in accordance with an illustrative embodiment of the invention. A media abbreviation is an incomplete form of a media file that either is a shortened audio/visual version of a streamable media file, or is a summary of details of the media file, such as a synopsis of plot that concludes after the final sound. A media abbreviation can be a textual description, in summary form, of content of the media file including at least the matching position, but not including the conclusion of the media file.

Data structure 700 includes at least two fields per row, namely, a playback time, and a media abbreviation. The playback time can be a number of minutes of normal playback time it takes to reach at least the content described in the media abbreviation in the same row. Thus, for example, playback of a media file up to 10 minutes, as shown in playback time 711, can correspond to a media abbreviation, in this case, the synopsis of plot, "Dorothy visits with ranch hands and traveling salesman" 713. Accordingly, for embodiments that produce summaries of a portion of a media file to the currently viewed point, one or more of the synopses can be collected and transmitted, for example, as described in step 609 above. For example, if a family watching a movie is interrupted by a teenager who enters the room late, for example, at 20 minutes into the movie "The Wizard of Oz", the teenager, through operation of his mobile device, can query the server to generate at least two synopses, "Dorothy visits with ranch hands and traveling salesman" 713 and "A tornado rips Dorothy's house from the foundation" 723. A later synopsis, beyond any time matched by operation of step 607, above, may not be transmitted by the server to the teenager's mobile device, since the final sound matches video progress that is less than playback time 721. Illustrative embodiments include those that transmit media abbreviations that explain plot that lag the user-captured sound file (e.g. the sound file obtained at step 803, below), as well as those that transmit media abbreviations that lead the user-captured sound file. A passage is the smallest unit of a synopsis, for example, passages 713 and 723. It is appreciated that a user may express a preference to have a synopsis delivered that concludes explaining the plot to a point before the user requested the synopsis. Such a preference can be entered by the user to a user interface of the device to form a user-selectable preference. Alternatively, a user may prefer to obtain synopses that conclude some time after the user requested the synopsis, for example one minute after the request. As such, the user may indicate her user-selectable preference to obtain an extended synopsis, for example, to account for a user's expected time to obtain the synopsis and the time the user spends reading the synopsis while the media file renders from an audio and/or video device.

FIG. 8 is a flow chart of a process on a mobile device in accordance with an illustrative embodiment of the invention. The mobile device is an addressable device that performs the steps of process 800. Initially, the mobile device can receive a command to request a media abbreviation (step 801). Next, the mobile device may record ambient sound to form a sound file (step 803). The sound file is formed, typically, on the basis of a user input. Accordingly, it may sometimes be called a user-captured sound file. Ambient sound is sound that includes at least the sound of any played back media file. Next, the mobile device may send the resultant sound file to a server (step 805). The server can be the server that operates process 600.

Next, the mobile device may receive a copy of the media file (step 807). The copy of the media file can form a media abbreviation. In this case, the media abbreviation is a portion of the media file that follows that which matches the sound recording, given that matching is a lose matching that accommodates poor recording quality and possible non-media file ambient noise. In another embodiment, step 807 can be the mobile device receiving a media abbreviation, for example, as corresponding to the server step of transmitting a synopsis of "The Wizard of Oz", e.g. at step 609 of FIG. 6.

Next, the mobile device may play back the copy of the media file at a resume point (step 819). Processing may terminate thereafter.

Some variants of the steps of process 800 are possible in alternative embodiments. For example, the step of receiving a copy of the media file, step 807, can be conditioned on authorizing payment. Payment can be authorized by the mobile device concurrently or contemporaneously with sending the sound file, for example, at step 805. Authorizing payment can include the user authenticating herself, such as, for example, by using biometric information or providing password information.

Further variants permit receiving a command to request a media abbreviation at step 801 by permitting a user to make a touch input to signal the user's desire to request a media abbreviation and, optionally, to pay for the media abbreviation. The command to request a media abbreviation, in this embodiment, is the user's touch input. Further alternative forms to the command to request a media abbreviation can include voice commands and gestures. In addition, the copy of the media file can alternatively be the entire media file, that may be received with an additional piece of data, namely, an indicator of the resume point. An indicator of the resume point is the point in time during playback that corresponds to the sound file sent at step 805. Accordingly, a modified step 819 may permit the mobile device to play back at the resume point.

Accordingly, some illustrative embodiments can detect a user's presence and/or level of distraction in order to stop playing back of a media file. Moreover, a user's user-characterized rewind descriptions can be measured based on historical patterns, wherein correlations to a media file's complexity and durations of interruptions in play can provide ad hoc assessments for a user's desired quantity of re-rendering of a media file.

Accordingly, some illustrative embodiments can respond to a user's command to obtain a media abbreviation, either in synopsis form, or as a truncated form that extends from a previous rendering session. In this manner, two classes of users can benefit. First, a user who arrives late to a group viewing of a media file can obtain synopses of the previously rendered material to the group. Second, a user who needs to depart or otherwise become mobile can request that a remainder or other portion of a media file be copied to the user's mobile device.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable storage device providing program code for use by or in connection with a computer or any instruction execution system. For the purposes of this description, a computer-usable or computer readable storage device can be any tangible apparatus that can store, the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or computer readable tangible storage devices through intervening private or public networks. Modems, cable modem and Ethernet cards are just a few of the currently available types of network adapters.

The description of the present invention has been presented for purposes of illustration and description and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for replaying a media file, the method comprising:
 a computer obtaining at least one media file;
 the computer receiving a user-characterized rewind description;
 the computer storing the user-characterized rewind description;
 the computer rendering the at least one media file to include a resume point of the at least one media file;
 the computer receiving a command to preferentially rewind;
 the computer, responsive to receiving the command to preferentially rewind, re-rendering the at least one media file to the user-characterized rewind description such that the display shows the at least one media file at a replay point of the media file at least the user-characterized rewind description prior to the resume point;

the computer using a camera to determine a ratio of eyes-closed to eyes-open and a microphone to determine a threshold level of sound prior to terminating review, and in response to user inattentiveness based on either the ratio exceeding the first level or the threshold level exceeding a second level, the computer updating the replay point to a location overlapping previously rendered material rendered before a determination that the ratio exceeds the first level or that the threshold level of sound exceeds the second level in proportion to a delay between the determination that the ratio exceeds the first level or that the threshold level of sound exceeds the second level and receiving the command to preferentially review and based, at least in part, on a grade-level tag assigned to the media file.

2. A computer program product for playback positioning the computer program product comprising:
   a computer usable tangible storage device having computer usable program code embodied therewith, the computer program product comprising:
   computer usable program code configured to obtain at least one media file;
   computer usable program code configured to receive a user-characterized rewind description;
   computer usable program code configured to store the user-characterized rewind description;
   computer usable program code configured to render the at least one media file to include a resume point of the at least one media file;
   computer usable program code configured to receive a command to preferentially rewind;
   computer usable program code configured to re-render the at least one media file based on a grade-level tag assigned to the media file and the user-characterized rewind description such that the display shows the at least one media file at a replay point of the media file at least the user-characterized rewind description prior to the resume point, responsive to computer usable program code configured to receive the command to preferentially rewind; and
   computer usable program code configured to use a camera to determine a ratio of eyes-closed to eyes-open and a microphone to determine a threshold level of sound prior to terminating review, and in response to user inattentiveness based on either the ratio exceeding a first level or the threshold level exceeding a second level, update the replay point to a location that is overlapped to previously rendered material rendered before a determination that the ratio exceeds the first level or that the threshold level of sound exceeds the second level in proportion to a delay between the determination that the ratio exceeds the first level or that the threshold level of sound exceeds the second level and receiving the command to preferentially review and based, at least in part, on a grade-level tag assigned to the media file.

3. The computer program product of claim 2, wherein the user-characterized rewind description is based on a command initiating replay and a delta time.

4. A data processing system for playback positioning, the data processing system comprising:
   a hardware processor, a computer readable memory and a computer readable tangible storage device;
   first program instructions to obtain at least one media file;
   second program instructions to receive a user-characterized rewind description;
   third program instructions to store the user-characterized rewind description;
   fourth program instructions to render the at least one media file to include a resume point of the at least one media file;
   fifth program instructions to receive a command to preferentially rewind;
   sixth program instructions to re-render the at least one media file to the user-characterized rewind description such that the display shows the at least one media file at a replay point of the media file at least the user-characterized rewind description prior to the resume point, responsive to fifth program instructions configured to receive the command to preferentially rewind;
   seventh program instructions to use a camera to determine a ratio of eyes-closed to eyes-open and a microphone to determine a threshold level of sound prior to terminating review, and in response to user inattentiveness based on either the ratio exceeding a first level or the threshold level exceeding a second level,
   eighth program instructions to update, based on a grade-level tag assigned to the media file, the replay point to a location that is overlapped to previously rendered material rendered before a determination that the ratio exceeds the first level or that the threshold level of sound exceeds the second level in proportion to a delay between the determination that the ratio exceeds the first level or that the threshold level of sound exceeds the second level and receiving the command to preferentially review, wherein the first, second, third, fourth, fifth, sixth, seventh and eighth program instructions are stored on the computer readable tangible storage device for execution by the hardware processor via the computer readable memory.

5. The data processing system of claim 4, wherein the user-characterized rewind description is based on a command initiating replay and a delta time.

6. The method of claim 1, wherein the user-characterized rewind description is based on a command initiating replay and a delta time.

7. The method of claim 1, wherein the ratio is a duration of eyes closed over a predetermined sampling period such that the ratio is more than 0% and less than 100%.

8. The computer program product of claim 2, wherein the ratio is a duration of eyes closed over a predetermined sampling period such that the ratio is more than 0% and less than 100%.

9. The data processing system of claim 2, wherein the ratio is a duration of eyes closed over a predetermined sampling period such that the ratio is more than 0% and less than 100%.

* * * * *